US 12,140,181 B2

(12) United States Patent
Ahrens et al.

(10) Patent No.: US 12,140,181 B2
(45) Date of Patent: Nov. 12, 2024

(54) PRE-LOADED DEEP GROOVE BALL BEARING

(71) Applicant: AKTIEBOLAGET SKF, Gothenburg (SE)

(72) Inventors: Marshall B Ahrens, Houston, TX (US); John Elliot Cardwell, III, Harleysville, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 272 days.

(21) Appl. No.: 17/902,002

(22) Filed: Sep. 2, 2022

(65) Prior Publication Data

US 2024/0077106 A1 Mar. 7, 2024

(51) Int. Cl.
| | |
|---|---|
| *F16C 19/16* | (2006.01) |
| *F16C 35/06* | (2006.01) |
| *F16C 35/063* | (2006.01) |
| *F16C 35/067* | (2006.01) |

(52) U.S. Cl.
CPC ............ *F16C 19/16* (2013.01); *F16C 35/063* (2013.01); *F16C 35/067* (2013.01); *F16C 2240/56* (2013.01); *F16C 2240/70* (2013.01)

(58) Field of Classification Search
CPC .......... F16C 19/04; F16C 19/06; F16C 19/16; F16C 19/163; F16C 35/063; F16C 35/067; F16C 35/07; F16C 35/073; F16C 35/077; F16C 2240/56; F16C 2240/70; F16C 2240/76

See application file for complete search history.

(56) References Cited

U.S. PATENT DOCUMENTS

| | | | |
|---|---|---|---|
| 10,859,113 B2 * | 12/2020 | Kullin | F16C 19/38 |
| 2003/0103703 A1 * | 6/2003 | Ishiwada | F16C 33/416 |
| | | | 384/531 |
| 2007/0086689 A1 * | 4/2007 | Qiu | H01J 35/1024 |
| | | | 384/493 |
| 2011/0250998 A1 * | 10/2011 | Hizuka | F16C 33/62 |
| | | | 474/8 |
| 2022/0319545 A1 * | 10/2022 | Tsuchiya | F16C 19/527 |
| 2024/0030773 A1 * | 1/2024 | Brushkivskyy | H02K 5/15 |

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A mechanical assembly includes an inner member, an outer member disposed about the inner member, a bearing inner ring, a bearing outer ring and a plurality of balls disposed between the two rings. The inner member has an outer circumferential surface with an outside diameter, which has a tolerance of greater than +/−0.00125". The outer member has an inner circumferential surface with an inside diameter, which has a tolerance of greater than +/−0.002". The inner ring has an annular groove with an inside diameter and the outer ring has an annular groove with an outside diameter. The balls are disposed within the two grooves and has a diameter sized such that the sum of twice the diameter plus the inside diameter of the inner ring groove is greater than the outside diameter of the outer ring groove, thereby establishing an internal preload in the bearing.

12 Claims, 5 Drawing Sheets

PRE-LOADED DEEP GROOVE BALL BEARING

BACKGROUND OF THE INVENTION

The present invention relates to bearings, and more particularly to deep groove ball bearings.

Rolling element bearings are well known and include an inner ring with an inner raceway, an outer ring with an outer raceway disposed about the inner ring, and a plurality of rolling elements disposed between the inner and outer rings. One particular type of rolling element bearing is commonly referred to as a "deep groove ball bearing" and includes balls as the rolling elements and has symmetrical grooves in each ring providing the bearing raceways. Typically, such bearings are provided with an external mechanism, such as a wave spring, etc., to exert a force on one of the rings to establish a "preload" of the balls against the raceways.

SUMMARY OF THE INVENTION

In one aspect, the present invention is a mechanical assembly comprising an inner member having a central axis and an outer circumferential surface with an outside diameter, the inner member being formed such that a value of the outside diameter has a tolerance of greater than plus or minus thirty-two microns (>+/−32μ). An outer member is disposed about the inner member and has an inner circumferential surface spaced radially outwardly from the outer surface of the inner member and having an inside diameter, the outer member being formed such that a value of the inside diameter has a tolerance of greater than plus or minus fifty microns (>+/−50μ). A bearing inner ring has an inner circumferential surface disposed about the outer circumferential surface of the inner member, an outer circumferential surface and at least one annular groove extending radially inwardly from the outer circumferential surface, the groove having an outside diameter with a minimum value at a central section of the groove. A bearing outer ring is disposed about the inner ring and has an outer circumferential surface disposed against the inner circumferential surface of the outer member, an inner circumferential surface and at least one annular groove. The annular groove extends radially outwardly from the inner circumferential surface and has an inside diameter with a maximum value at a central section of the groove. Further, a plurality of balls are disposed between the inner ring and the outer ring, each ball being sized having a diameter with a value greater than half of a difference between the maximum value of the diameter of the outer ring groove and the minimum value of the diameter of the inner ring groove. Also, the assembly further comprises an inner clamp configured to axially and/or radially retain the inner ring on the inner member and/or an outer clamp configured to axially and/or radially retain the outer ring within the outer member.

Preferably, the bearing inner ring is sized such that the inner circumferential surface of the inner ring engages with the outer circumferential surface of the inner member with a transition fit or a clearance fit. Furthermore, the bearing outer ring is preferably sized such that the outer circumferential surface of the outer ring engages with the inner circumferential surface of the outer member with a transition fit or a clearance fit.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
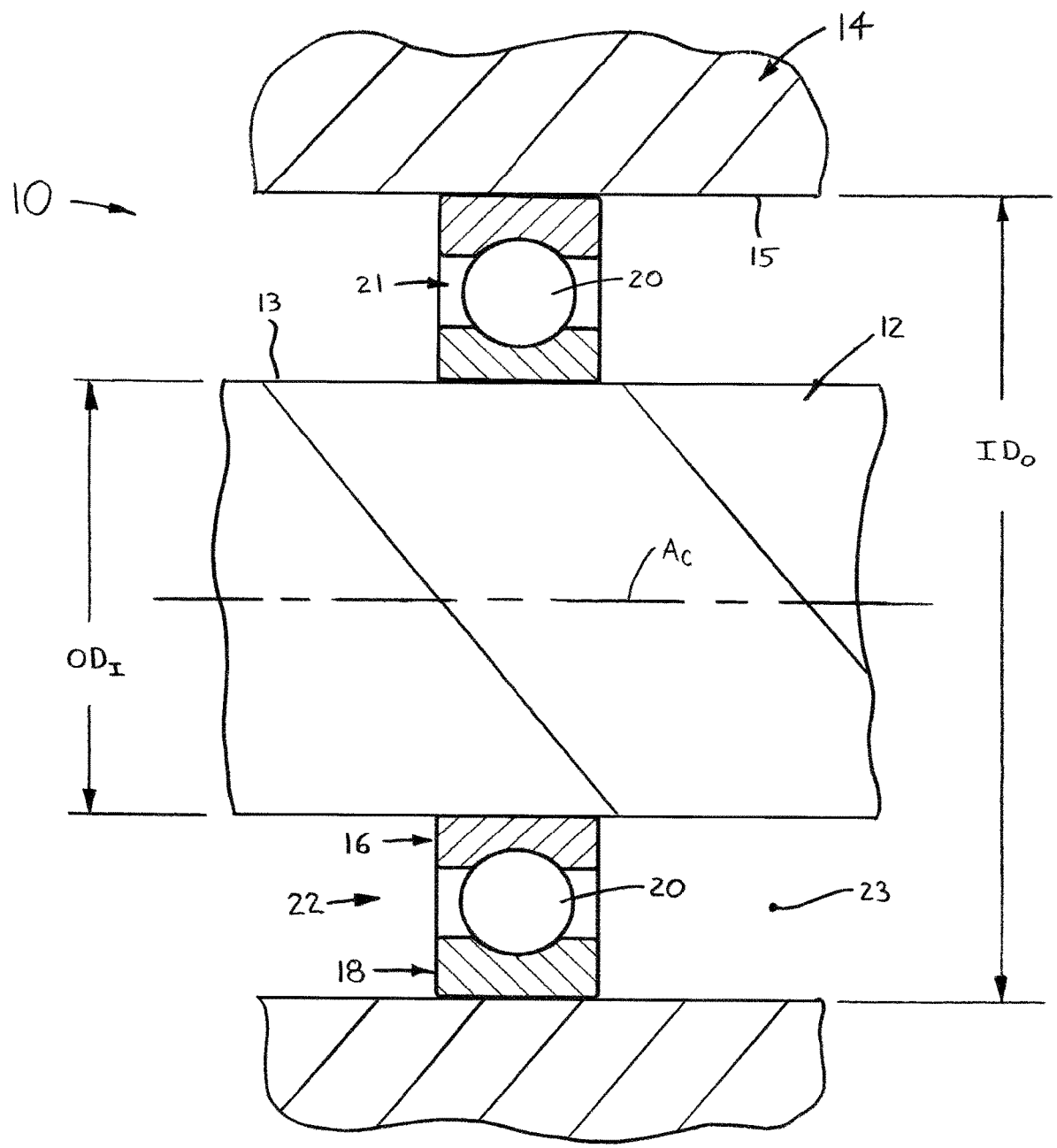
FIG. 1 is a broken-away, axial cross-sectional view of a mechanical assembly of the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a mechanical assembly 10 which basically comprises an inner member 12 with a central axis $A_C$, an outer member 14 disposed about the inner member 12, a bearing outer ring 16 disposed about the inner member 12, a bearing outer ring 18 disposed about the inner ring 16 and within the outer member 14, and a plurality of balls 20 disposed between the inner and outer rings 16, 18. Preferably, the inner member 12 is shaft and the outer member 14 is a housing, and one of the inner and outer members 12, 14 is rotatable about the central axis $A_C$ with respect to the other member 14, 12, most preferably the inner member 12 is rotatable. Alternatively, the inner member 12 may be a fixed axle and the outer member 14 may be a rotatable hub, and the present mechanical assembly 10 may include any other desired combination of members 12, 14 formed in any desired manner. Further, the inner and outer rings 16, 18 and the balls 20 form a bearing 22 which rotatably couples the inner member/shaft 12 and the outer member/housing 14.

More specifically, the inner member or shaft 12 has an outer circumferential surface 13 with an outside diameter $OD_I$ (FIG. 1), and is formed such that a value of the outside diameter $OD_I$ has a tolerance of greater than plus or minus thirty-two microns (>+/−32µ). In other words, the total tolerance on the outside diameter $OD_I$ is greater than sixty-four microns (>64µ). Such a tolerance value on a shaft surface 13 for receiving a bearing ring, such as the inner ring 16, is relatively substantial and beyond conventionally recommended tolerancing for a shaft of a standard bearing assembly.

The outer member or housing 14 has an inner circumferential surface 15 spaced radially outwardly from the outer surface 13 of the inner member/shaft 12, which defines a housing bore 23 and has an inside diameter $ID_O$ (FIG. 1). The outer member 14 is formed such that a value of the inside diameter $ID_O$ has a tolerance of greater than plus or minus fifty microns (>50µ); in other words, a total tolerance on the inside diameter $ID_O$ is greater than one hundred microns (>100µ). As with the tolerance on the outer surface 13 of the inner member/shaft 12, the tolerance on the inner surface 13 or bore 23 of the outer member/housing 14 for receiving a bearing outer ring, such as then outer ring 18, is substantial and much greater than conventionally recommended tolerances on the housing bore of a standard bearing assembly.

Figure 2:
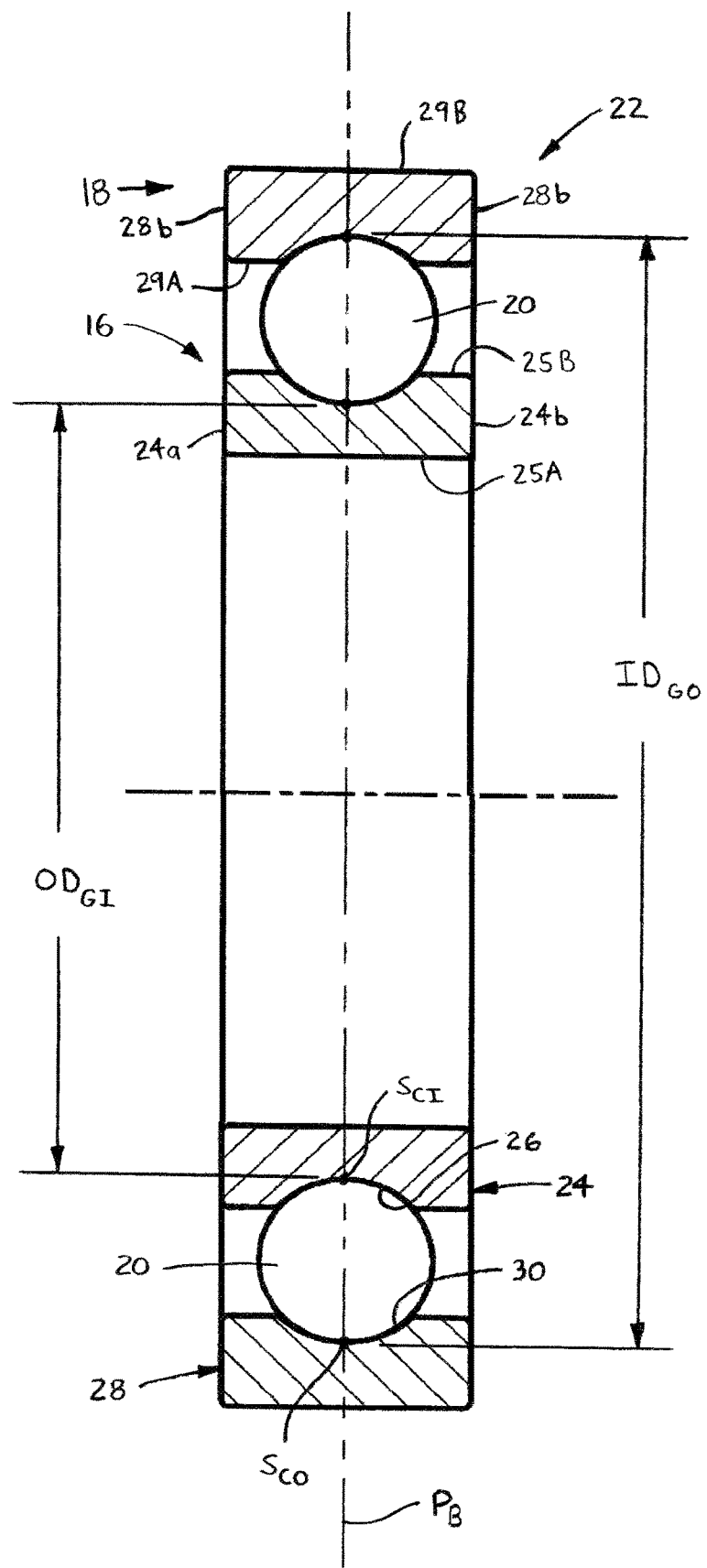
FIG. 2 is an axial cross-sectional view of a bearing of the present mechanical assembly.
Figures 3, 4:
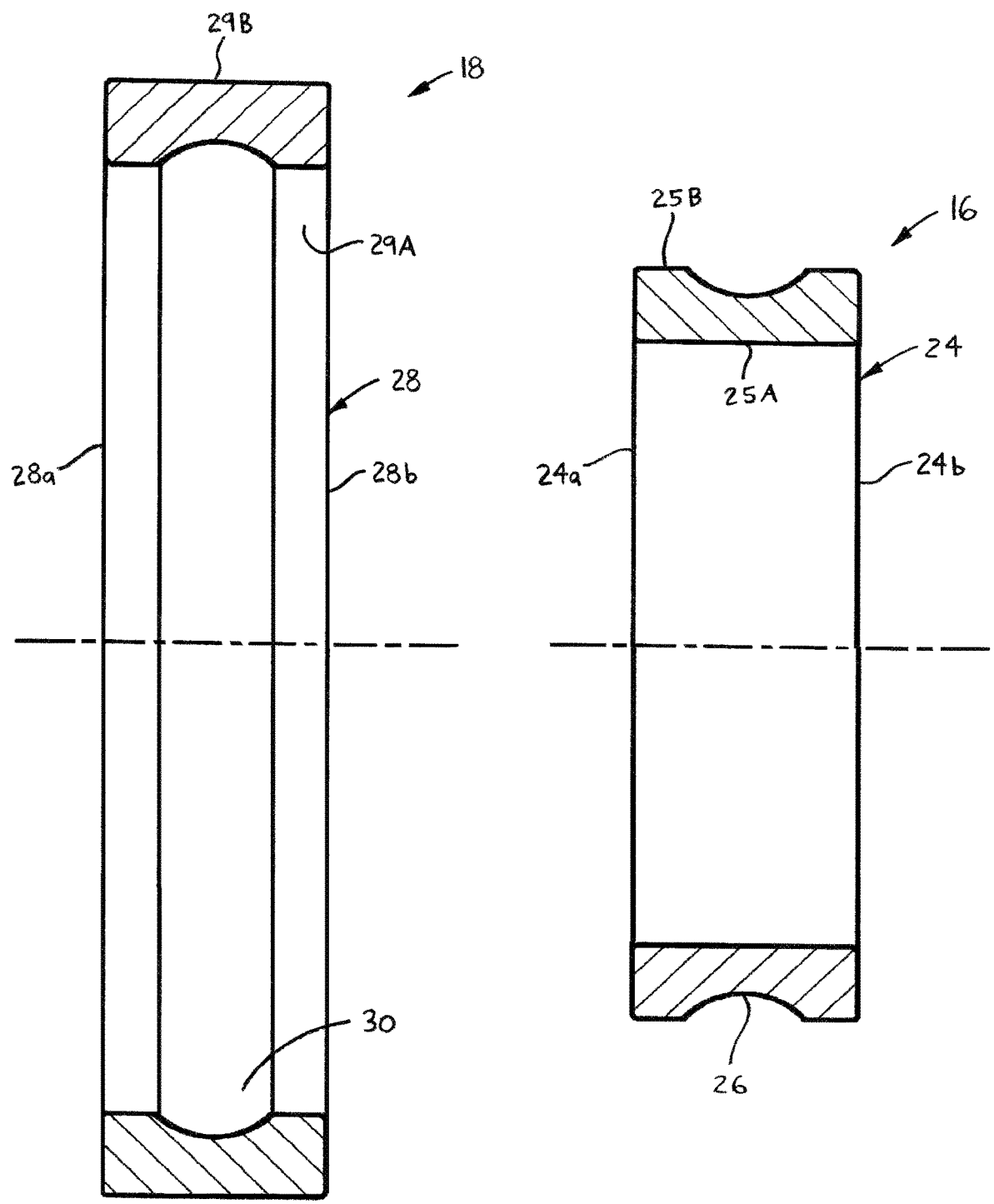
FIG. 3 is an axial cross-sectional view of an outer ring of the bearing.
FIG. 4 is an axial cross-sectional view of an inner ring of the bearing.
Figure 5:
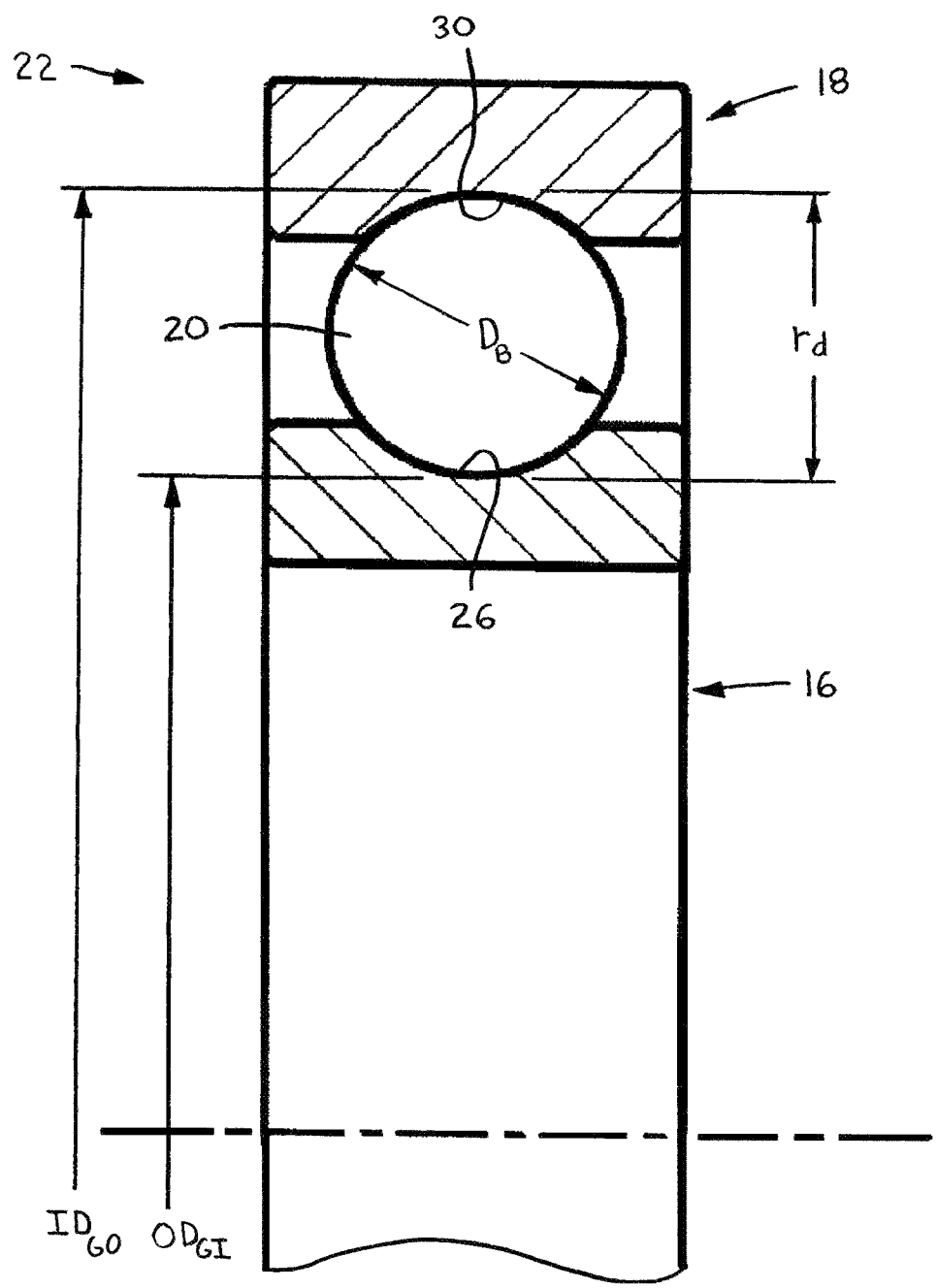
FIG. 5 is an enlarged broken-away, axial cross-sectional view of an upper portion of the bearing.

Referring to FIGS. 2 and 4, the bearing inner ring 16 includes an annular body 24 having an inner circumferential surface 25A, an outer circumferential surface 25B and opposing first and second axial ends 24a, 24b. The inner circumferential surface 25A is disposed about the outer circumferential surface 13 of the inner member 12, the inner ring 16 preferably being sized such that the inner circumferential surface 25A engages with the outer circumferential surface 13 with a transition fit or a clearance fit. Also, at least one inner annular groove 26 (and possibly two or more grooves 26) extends radially inwardly from the outer circumferential surface 25B and provides a bearing inner raceway. The groove 26 has an outside diameter $OD_{GI}$ (FIG. 2) with a least or minimum value at a central section $s_{CI}$ of the groove 26, and the inner ring 16 is preferably formed such that the annular groove 26 is symmetrical about a central plane $P_B$ (FIG. 2) extending radially through the central section $s_{CI}$. As such, the inner ring 16 is formed as an inner ring of what is commonly referred to as a "deep groove ball bearing".

Referring to FIGS. 2 and 3, the bearing outer ring 18 includes an annular body 28 having an inner circumferential surface 29A, an outer circumferential surface 29B, and opposing first and second axial ends 28a, 28b. The outer circumferential surface 29B is disposed against the inner circumferential surface 15 of the outer member/housing 14, the outer ring 18 preferably being sized such that the outer circumferential surface 29B engages with the inner circumferential surface 15 with a transition fit or a clearance fit. Further, at least one (or more) outer annular groove 30 extends radially outwardly from the inner circumferential surface 29A and provides a bearing outer raceway. The groove(s) 30 each have an inside diameter $ID_{GO}$ with a greatest or maximum value at a central section $s_{CO}$ of the groove 30, and is preferably formed such that the annular groove 30 is symmetrical about the central plane $P_B$ (FIG. 2) extending radially through the central section $s_{CO}$ of the groove 30, and thus formed as a groove of a deep groove ball bearing.

Furthermore, the plurality of balls 20 form a ball set 21 and are each disposed between the inner and outer rings 16, 18 so as to be rollable simultaneously along the inner and outer grooves 26, 30. Each ball 20 is sized having a diameter $D_B$ that is greater than the radial space or distance $r_d$ (FIG. 5) between the inner and outer annular grooves 26, 30. Specifically, the ball diameter $D_B$ has a value greater than half of a difference between the maximum value of the inside diameter $ID_{GO}$ of the outer ring groove 30 and the minimum value of the outside diameter $OD_{GI}$ of the inner ring groove 26, or $D_B > \frac{1}{2}(ID_{GO} - OD_{GI})$. Such sizing of the balls 20 may alternatively be expressed as the sum of twice the value of the ball diameter $D_B$ and the minimum value of the outside diameter $D_{GI}$ of the inner ring groove 26 is greater than the maximum value of the inside diameter $ID_{GO}$ of the outer ring groove 30, or $(2 \times D_B) + OD_{GI} > ID_{GO}$.

In any case, such "oversized" balls 20 provide an internal preload and a relative stiffness between the inner member 12 and the outer member 14 so that the bearing 22 has rigidity when supporting moment loading. Thus, the internally preloaded bearing 22 is capable of being installed and functional within a mechanical assembly 10 in which the inner and outer members 12, 14 are manufactured with relatively wide or "loose" tolerances, as discussed in further detail below.

Figure 7:
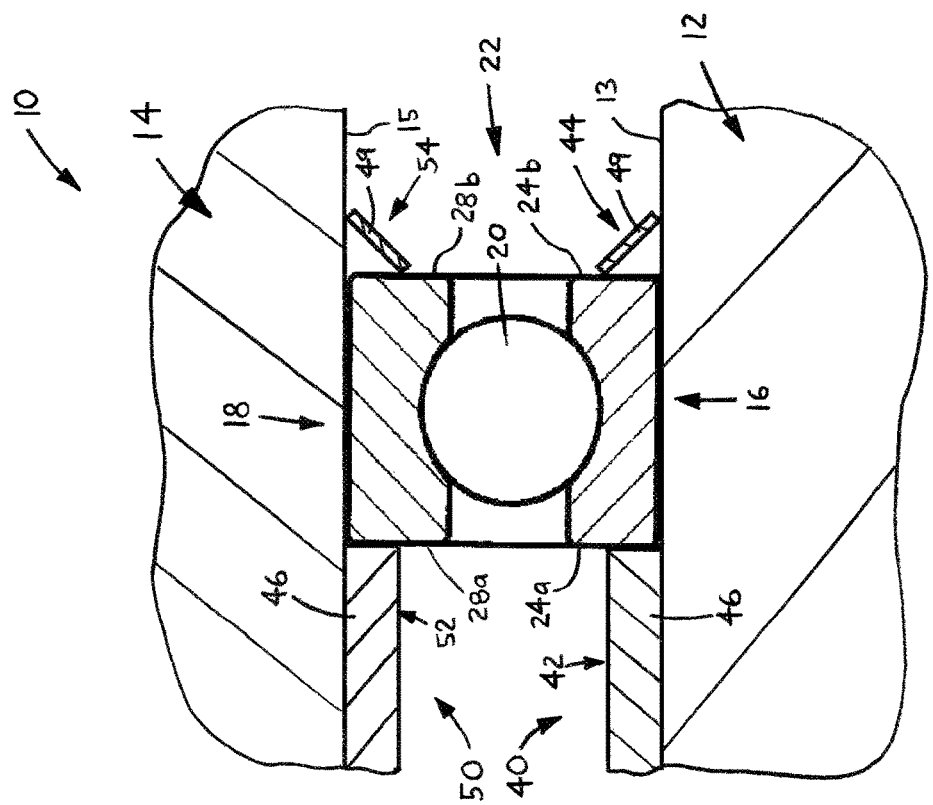
FIG. 7 is a broken-away, axial cross-sectional view of an upper portion of the mechanical assembly, showing inner and outer clamps, each clamp being a combination of a sleeve and a spring.
Figure 6:
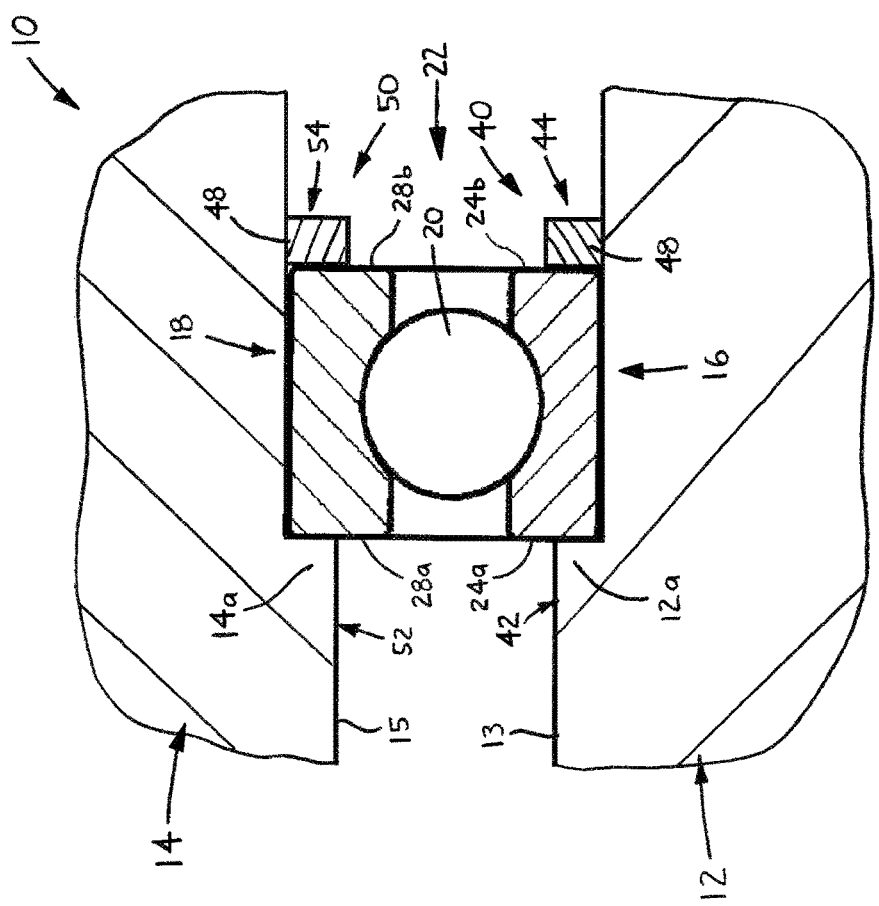
FIG. 6 is a broken-away, axial cross-sectional view of an upper portion of the mechanical assembly, showing inner and outer clamps, each clamp being a combination of an integral portion of a first or second member and a ring.

Referring to FIGS. 6 and 7, the mechanical assembly 10 preferably further comprises an inner clamp 40 and/or an outer clamp 50 for retaining the rings 16, 18. The inner clamp 40 is configured to axially and/or radially retain the inner ring 16 on the inner member/shaft 12 and the outer clamp 50 is configured to axially and/or radially retain the outer ring 18 on the outer member/housing 14. Specifically, the inner clamp 40 includes a first clamping member 42 disposed against the first axial end 24a of the bearing inner ring 16 and a second clamping member 44 disposed against the second axial end 24b of the bearing inner ring 16. Each one of the first and second clamping members 42, 44 is either an integral portion 12a of the inner member 12 or a sleeve 46, a ring 48 or a spring 49 disposed about the inner member 12.

Similarly, the outer clamp 50 includes a first clamping member 52 disposed against the first axial end 28a of the bearing outer ring 18 and a second clamping member 54 disposed against the second axial end 28b of the bearing outer ring 18. As with the inner clamp 40, the first and second clamping members 50, 52 of the outer clamp 50 are either an integral portion 14a of the outer member 14 or a sleeve 46, a ring 48, or a spring 49 disposed within the bore 23 of the outer member 14. Either one or both of the inner and outer clamps 40, 50 may further include a centering feature, such as a small taper or radiused portion, that engages with the rings 16 or 18 to center the rings 16, 18 with respect to the central axis $A_C$. Further, either one of the inner and outer clamps 40, 50 may include other components to actuate or retain the clamping members, such as threaded fasteners, etc., and/or the members 12, 14 may be provided with features such as threading, grooves, etc., used by the clamping members. However, the mechanical assembly 10 may include only one of the clamps 40 or 50 or even be utilized without any clamping or retaining features.

With the structure above, the bearing 22 may be utilized with inner and outer members 12, 14 that do not require any additional fabrication or finish machining. Specifically, the bearing inner ring 16 is assembled onto the inner member/shaft 12 without machining of the outer circumferential surface 13 of the inner member 12 to fit within the bearing inner ring 12. Similarly, the bearing outer ring 18 is assembled within the outer member/housing 14 without machining of the inner circumferential surface 15 of the outer member 14 to receive the bearing outer ring 18.

Typically, conventional bearings are mounted on shafts and within housings which require finish machining, such as honing, grinding, etc., in order to provide the necessary dimensioning of the shaft outer surface and the housing inner surface to establish a press-fit or interference fit with the bearing rings. However, with the internally pre-loaded bearing 22 of the present invention, the inner member 12 and outer member 14 may be manufactured or fabricated with dimensions having a relatively wide tolerance range and still effectively function with the bearing 22.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A mechanical assembly comprising:
   an inner member having a central axis and an outer circumferential surface with an outside diameter, the inner member being formed such that a value of the outside diameter has a tolerance of greater than plus or minus thirty-two microns (>+/−32µ);
   an outer member disposed about the inner member and having an inner circumferential surface spaced radially outwardly from the outer surface of the inner member and having an inside diameter, the outer member being formed such that a value of the inside diameter has a tolerance of greater than plus or minus fifty microns (>+/−50µ);
   a bearing inner ring having an inner circumferential surface disposed about the outer circumferential surface of the inner member, an outer circumferential surface and at minimum one annular groove extending radially inwardly from the outer circumferential surface, the groove having a diameter with a minimum value at a central section of the groove;
   a bearing outer ring disposed about the inner ring and having an outer circumferential surface disposed against the inner circumferential surface of the outer member, an inner circumferential surface and at least one annular groove extending radially outwardly from the inner circumferential surface, the groove having a diameter with a maximum value at a central section of the groove;
   a plurality of balls disposed between the inner ring and the outer ring, each ball being sized having a diameter with a value greater than half of a difference between the maximum value of the diameter of the outer ring groove and the minimum value of the diameter of the inner ring groove; and
   at least one of an inner clamp configured to axially retain the inner ring on the inner member and an outer clamp configured to axially retain the outer ring within the outer member.

2. The mechanical assembly as recited in claim 1 wherein:
   the bearing inner ring is sized such that the inner circumferential surface of the inner ring engages with the outer circumferential surface of the inner member with a transition fit or a clearance fit; and
   the bearing outer ring is sized such that the outer circumferential surface of the outer ring engages with the inner circumferential surface of the outer member with a transition fit or a clearance fit.

3. The mechanical assembly as recited in claim 1 wherein:
   the inner clamp includes a first clamping member disposed on a first axial side of the bearing inner ring and a second clamping member disposed on a second axial side of the bearing inner ring, each one of the first and second clamping members being one of an integral portion of the inner member, a sleeve disposed about the inner member, a ring disposed about the inner member and a spring disposed about the inner member; and
   the outer clamp includes a first clamping member disposed on a first axial side of the bearing outer ring and a second clamping member disposed on a second axial side of the bearing outer ring, each one of the first and second clamping members being one of an integral portion of the outer member, a sleeve disposed within the outer member, a ring disposed within the outer member or a spring disposed within the outer member.

4. The mechanical assembly as recited in claim 1 wherein the inner member includes a shaft and the outer member includes a housing.

5. The mechanical assembly as recited in claim 1 wherein one of the inner member and the outer member is rotatable about the central axis relative to the other one of the inner member and the outer member.

6. The mechanical assembly as recited in claim 1 wherein:
   the inner ring is formed such that the annular groove of the inner ring is symmetrical about a plane extending radially through the central section of the groove; and
   the outer ring is formed such that the annular groove of the outer ring is symmetrical about a plane extending radially through the central section of the groove.

7. The mechanical assembly as recited in claim 1 wherein:
   the bearing inner ring is assembled onto the inner member without machining of the outer circumferential surface of the inner member to fit within the bearing inner ring; and
   the bearing outer ring is assembled within the outer member without machining of the inner circumferential surface of the outer member to receive the bearing outer ring.

8. A mechanical assembly comprising:
   a shaft having a central axis and an outer circumferential surface with an outside diameter, the shaft being formed such that a value of the outside diameter has a tolerance of greater than plus or minus thirty-two microns (>+/−32µ);
   a housing disposed about the shaft and having an inner circumferential surface spaced radially outwardly from the inner surface of the shaft and having an inside diameter, the housing being formed such that a value of the inside diameter has a tolerance of greater than plus or minus fifty microns (>+/−50μ);

a bearing inner ring having an inner circumferential surface disposed about the outer circumferential surface of the shaft, an outer circumferential surface and at least one annular groove extending radially inwardly from the outer circumferential surface, the groove having an outside diameter with a minimum value at a central section of the groove, the bearing inner ring being sized such that the inner circumferential surface of the inner ring engages with the outer circumferential surface of the shaft with a transition fit or a clearance fit;

a bearing outer ring disposed about the inner ring and having an outer circumferential surface disposed against the inner circumferential surface of the housing, an inner circumferential surface and at least one annular groove extending radially outwardly from the inner circumferential surface, the groove having an inside diameter with a maximum value at a central section of the groove, the bearing outer ring being sized such that the outer circumferential surface of the outer ring engages with the inner circumferential surface of the housing with a transition fit or a clearance fit;

a plurality of balls disposed between the inner ring and the outer ring, each ball being sized having a diameter with a value greater than half of a difference between the maximum value of the inside diameter of the outer ring groove and the minimum value of the outside diameter of the inner ring groove; and at least one of an inner clamp configured to axially and/or radially retain the inner ring on the inner member and an outer clamp configured to axially and/or radially retain the outer ring within the outer member.

9. The mechanical assembly as recited in claim 8 wherein:
the inner clamp includes a first clamping member disposed on a first axial side of the bearing inner ring and a second clamping member disposed on a second axial side of the bearing inner ring, each one of the first and second clamping members being one of an integral portion of the shaft, a sleeve disposed about the shaft, a ring disposed about the shaft and a spring disposed about the shaft; and
the outer clamp includes a first clamping member disposed on a first axial side of the bearing outer ring and a second clamping member disposed on a second axial side of the bearing outer ring, each one of the first and second clamping members being one of an integral portion of the housing, a sleeve disposed within the housing, a ring disposed within the housing and a spring disposed within the housing.

10. The mechanical assembly as recited in claim 8 wherein:
the inner ring is formed such that the annular groove of the inner ring is symmetrical about a plane extending radially through the central section of the groove; and
the outer ring is formed such that the annular groove of the outer ring is symmetrical about a plane extending radially through the central section of the groove.

11. The mechanical assembly as recited in claim 10 wherein:
the bearing inner ring is assembled onto the shaft without machining of the outer circumferential surface of the shaft to fit within the bearing inner ring; and
the bearing outer ring is assembled within the housing without machining of the inner circumferential surface of the housing to receive the bearing outer ring.

12. The mechanical assembly as recited in claim 8 wherein one of the shaft and the housing is rotatable about the central axis relative to the other one of the shaft and the housing.

* * * * *